(12) United States Patent
Smart et al.

(10) Patent No.: US 9,304,053 B2
(45) Date of Patent: Apr. 5, 2016

(54) SYSTEM TO MONITOR PERFORMANCE OF PACKING MATERIAL IN A SEAL

(71) Applicant: Dresser, Inc., Addison, TX (US)

(72) Inventors: Harold Randall Smart, Portsmouth, RI (US); Edward James Nieters, Burnt Hills, NY (US); Frederick Wilson Wheeler, Niskayuna, NY (US)

(73) Assignee: Dresser, Inc., Addison, TX (US)

( * ) Notice: Subject to any disclaimer, the term of this patent is extended or adjusted under 35 U.S.C. 154(b) by 245 days.

(21) Appl. No.: 13/961,335

(22) Filed: Aug. 7, 2013

(65) Prior Publication Data

US 2015/0041000 A1 Feb. 12, 2015

(51) Int. Cl.
  *G01M 3/18* (2006.01)
  *G01M 3/02* (2006.01)
  *G01M 3/04* (2006.01)

(52) U.S. Cl.
  CPC ............... *G01M 3/02* (2013.01); *G01M 3/047* (2013.01); *G01M 3/184* (2013.01); *Y10T 137/8158* (2015.04); *Y10T 137/8342* (2015.04)

(58) Field of Classification Search
  CPC ..... G01M 3/047; G01M 3/183; G01M 3/184; G01M 3/2869; G01M 3/2876; Y10T 137/8158; Y10T 137/8342
  See application file for complete search history.

(56) References Cited

U.S. PATENT DOCUMENTS

| | | | |
|---|---|---|---|
| 4,573,344 A | 3/1986 | Ezekoye | |
| 4,576,344 A | 3/1986 | Sasaki et al. | |
| 4,901,751 A | 2/1990 | Story et al. | |
| 5,231,469 A | 7/1993 | Jeffers et al. | |
| 5,316,035 A | 5/1994 | Collins et al. | |
| 5,616,829 A * | 4/1997 | Balaschak et al. | 73/46 |
| 6,050,296 A * | 4/2000 | Hoffmann et al. | 137/552 |
| 6,298,377 B1 | 10/2001 | Hartikainen et al. | |
| 6,592,126 B2 * | 7/2003 | Davis | 277/320 |
| 6,601,005 B1 | 7/2003 | Eryurek et al. | |
| 6,763,703 B2 | 7/2004 | Krieger et al. | |
| 8,851,108 B2 * | 10/2014 | Lymberopoulos et al. | 137/556 |
| 2011/0315904 A1 | 12/2011 | Karte | |
| 2012/0041582 A1 | 2/2012 | Wallace | |
| 2013/0079895 A1 | 3/2013 | Hedtke et al. | |

FOREIGN PATENT DOCUMENTS

| | | |
|---|---|---|
| WO | 9506276 A1 | 3/1995 |
| WO | 9738254 A1 | 10/1997 |
| WO | 9905576 A2 | 2/1999 |
| WO | 0248686 A2 | 6/2002 |

OTHER PUBLICATIONS

PCT Search Report and Written Opinion issued in connection with corresponding Application No. PCT/US2014/047147 on Dec. 16, 2014.

* cited by examiner

*Primary Examiner* — Matthew W Jellett
(74) *Attorney, Agent, or Firm* — Paul Frank + Collins P.C.

(57) ABSTRACT

Embodiments of a system that can detect leaks that occur in seals, and in one example, to seals found in a valve. In one embodiment, the system utilizes sensors that measure fluid properties of a sample volume proximate to the seal. The system can compare data from these measurements with data from a sample of a reference fluid (e.g., ambient air) to indicate the presence of working fluid in the sample volume. This result may indicate problems with the seal, e.g., degradation of the seal that is meant to prohibit the working fluid from migrating out of the valve.

16 Claims, 7 Drawing Sheets

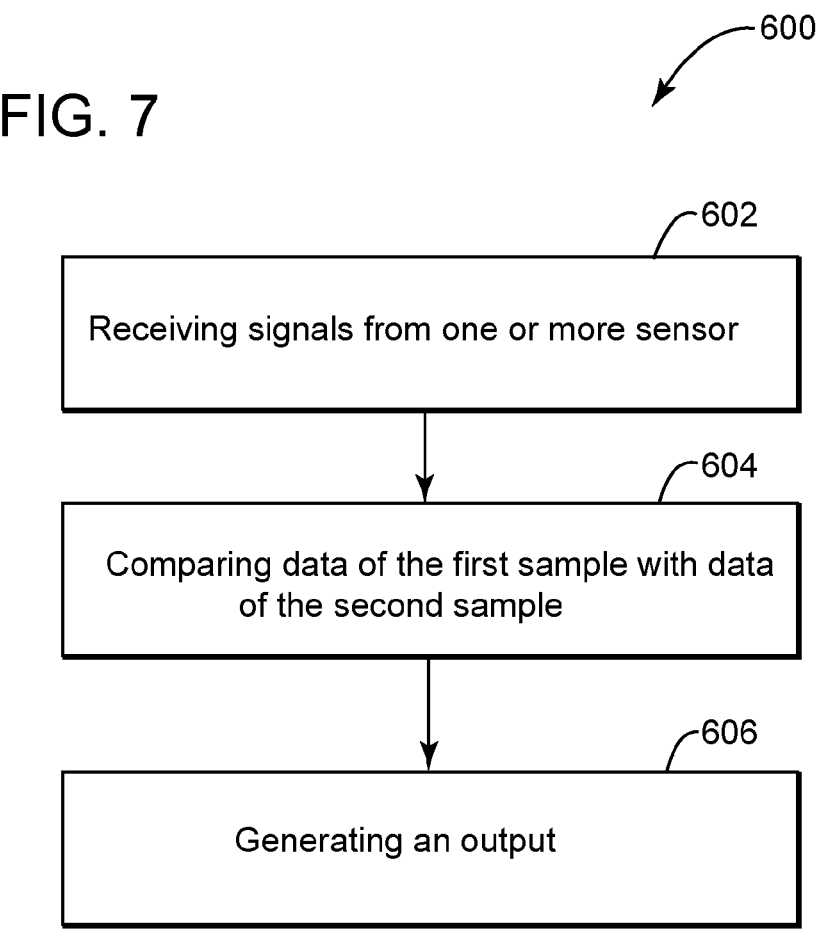

SYSTEM TO MONITOR PERFORMANCE OF PACKING MATERIAL IN A SEAL

BACKGROUND

The subject matter disclosed herein relates to valves and, in particular, to leak detection in valves.

Valves include devices that regulate delivery and distribution of fluids (e.g., liquids and gases). These devices can include control valves, which integrate into fluid distribution control systems in a wide variety of industries. These systems often require communication links with remote sensors and other feedback elements to monitor fluid properties, e.g., temperature, pressure, flow rate, etc. The system can generate signals that cause the control valve to modify the flow of fluid through the valve in response to detected fluid conditions.

Many control valves integrate controllers with digital components (e.g., microprocessors) that can monitor sensors and process signals. These digital components afford the control valve with precise control and functionality. Certain types of digital components can also expand data processing and communication capabilities of the controller. These features can improve the quality, accuracy, and speed of the control valve to respond to changes in detected conditions of the valve and fluid.

Digital-based controllers can provide more flexibility with respect to communicating fluid and control valve status with respect to conditions local to the control valve. Certain failures of the control valve may run afoul of regulations set forth by government organizations, such as the Environmental Protection Agency or the Occupational Safety and Health Administration and may require immediate maintenance or repair.

BRIEF SUMMARY OF THE INVENTION

This disclosure describes embodiments of systems and methods to detect working fluid that emanates from areas in and around a seal. Examples of the seal may prohibit working fluid from migrating out of a valve (e.g., a control valve). These embodiments can utilize sensors that measure fluid properties of a sample of fluid from a volume proximate to the seal. The embodiments can compare data from this measurement to data from measurements of the property from a sample of a reference fluid (e.g., ambient air). This comparison can indicate the presence of working fluid in the sample volume, which may identify problems with the seal, e.g., degradation of the seal.

For certain valves, these embodiments can monitor fluid that surrounds a dynamic stem seal of a control valve. The embodiments may provide a reference fluid to the space around the dynamic stem seal and, further, are configured to monitor the composition of a sample volume proximate the dynamic stem seal with devices (e.g., sensors) that generate signals using chemical, optical absorption spectrum, or other sensing techniques. To provide a robust sensing solution, the systems and methods herein can utilize two samples; a first fluid sample can comprise a mixture of a reference fluid (e.g., ambient air) and a working fluid that may leak from the dynamic stem seal and a second fluid sample that comprises the reference fluid. The systems and methods may correlate one or more differences in the physical composition of these two samples to an actual leak rate using a previously prepared and stored correlation table.

These embodiments can be implemented in positioning systems that already exist on control valves. This solution can leverage existing electrical power, instrument air, and communications of current control valve positioning instruments. To monitor dynamic seal leakage rate, several sensing technologies may be implemented depending on the target leaking fluid. Examples of sensors that will detect the presence of Volatile Organic Compounds (VOCs) are Metal Oxide Semiconductor (MOS) and Optical Absorption Spectrum sensors. The Optical Absorption Spectrum sensors will also be effective in sensing other substances such as particulates, steam and $H_2O$, and other chemicals.

In one embodiment, the system and method introduce a reference fluid to an enclosed space that may contain working fluid that leaks from the dynamic stem seal. Construction of the system may utilize a pressure regulator alone, and/or in combination with a fixed orifice to maintain one or more flow parameters (e.g., flow rate) of a reference fluid into the enclosed space. The embodiment can draw off a sample of fluid (e.g., a first fluid sample) found in the volume of the enclosed space. The embodiments may also present the first fluid sample to one or more sensors. The sensors can generate an output (and/or signal) with data that measures a property of the first fluid sample. In one example, the system and method can correlate the data to a leak rate of the leaking fluid. In another example, the system and method can compare the data of the sample fluid to data that reflects the property in a reference fluid (e.g., ambient air) to establish a differential measurement.

BRIEF DESCRIPTION OF THE DRAWINGS

Reference is now made briefly to the accompanying figures, in which:

FIG. 7 depicts a flow diagram of a method for detecting leaks in a control valve.

Where applicable like reference characters designate identical or corresponding components and units throughout the several views, which are not to scale unless otherwise indicated.

DETAILED DISCUSSION

Figure 1:
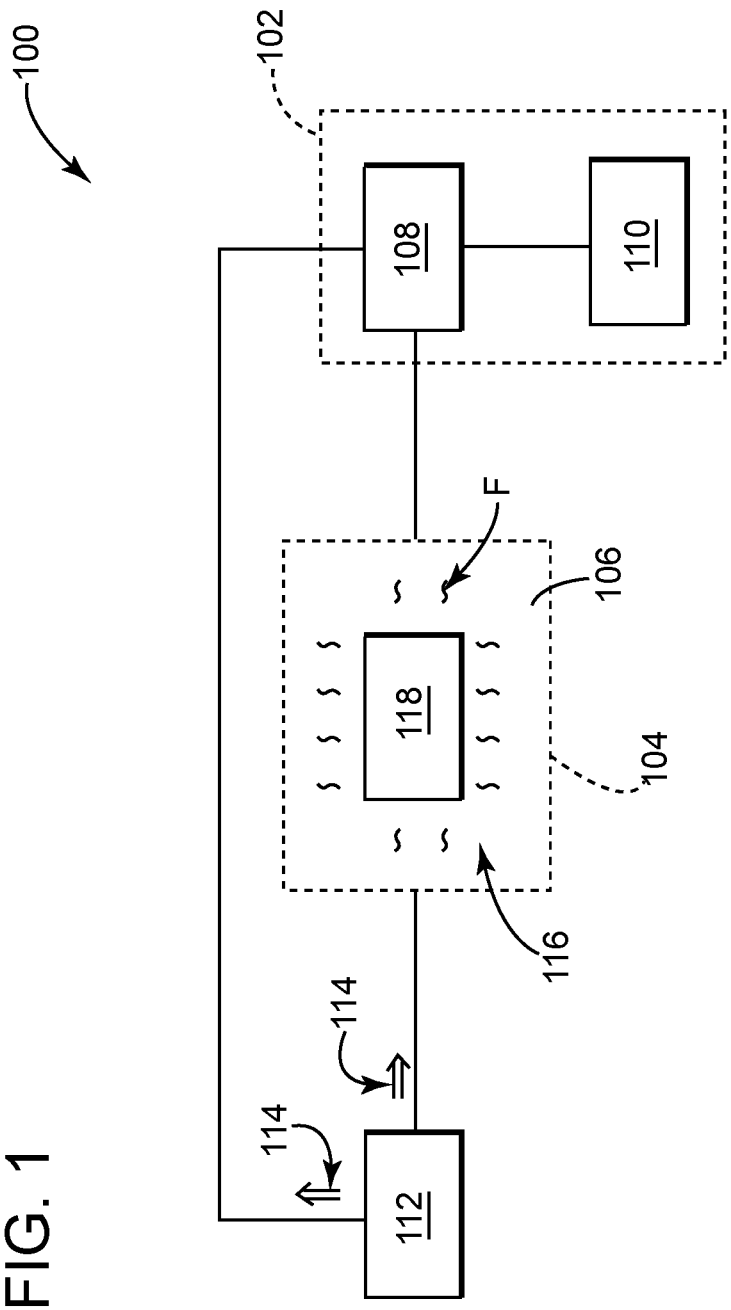
FIG. 1 depicts a schematic diagram of an exemplary embodiment of a system to detect leaks from a seal in a valve.

FIG. 1 illustrates a schematic diagram of an exemplary embodiment of a system 100 that can detect the presence of working fluid in and/or in proximity to a seal. The system 100 includes a diagnostic component 102 that couples with a measurement region 104. Examples of the measurement region 104 can form a sample volume 106 that can hold and/or retain a fluid (e.g., liquid and gas). The diagnostic component 102 includes a sensor component 108 that couples with the sample volume 106 and with a processing component 110. The system 100 can also include a fluid source 112 that provides a reference fluid 114 to the sample volume 106 and to the sensor component 108. In one example, the measurement region 104 couples with a part of a valve 116. This part may include a packing region 118 with packing material that seals portions of the valve 116. For example, and as discussed more below, this packing material may be disposed about a valve stem that translates, e.g., to modulate flow of working fluid through the valve 116.

Broadly, implementation of the system 100 is useful to characterize the integrity of seals and, in this particular example, to identify leaks that can occur in the packing region 118. Failure in the structure of packing material in the packing region 118 can allow trace amounts of the working fluid F to escape from the valve 116. Use of the system 100 can afford real-time monitoring of the packing region 118 to identify the presence of working fluid F in concentrations that would identify problems with the valve 116.

The sample volume 106 can be found in and/or in proximity to the valve 116. For example, the measurement region 104 may comprise a shroud and/or like structure that forms an enclosure that can receive working fluid F from the packing material of the valve 116. Examples of this enclosure can have an interior volume that is suited to form the sample volume 106. Use of the shroud can concentrate any working fluid F that penetrates the packing material. During operation of the valve 116, the system 100 may collect samples from this enclosure. The sensor component 108 may include one or more sensors that generate signals in response to properties and characteristics of the samples from the sample volume 106.

Embodiments of the system 100 can utilize various configurations to draw off samples of the sample volume 106. Examples of the reference source 112 may include pressurized containers and like devices that can generate the flow of the reference fluid 114 to the measurement region 104. This flow can carry, or "push," samples of the sample volume 106 to the sensor component 108.

Figure 2:
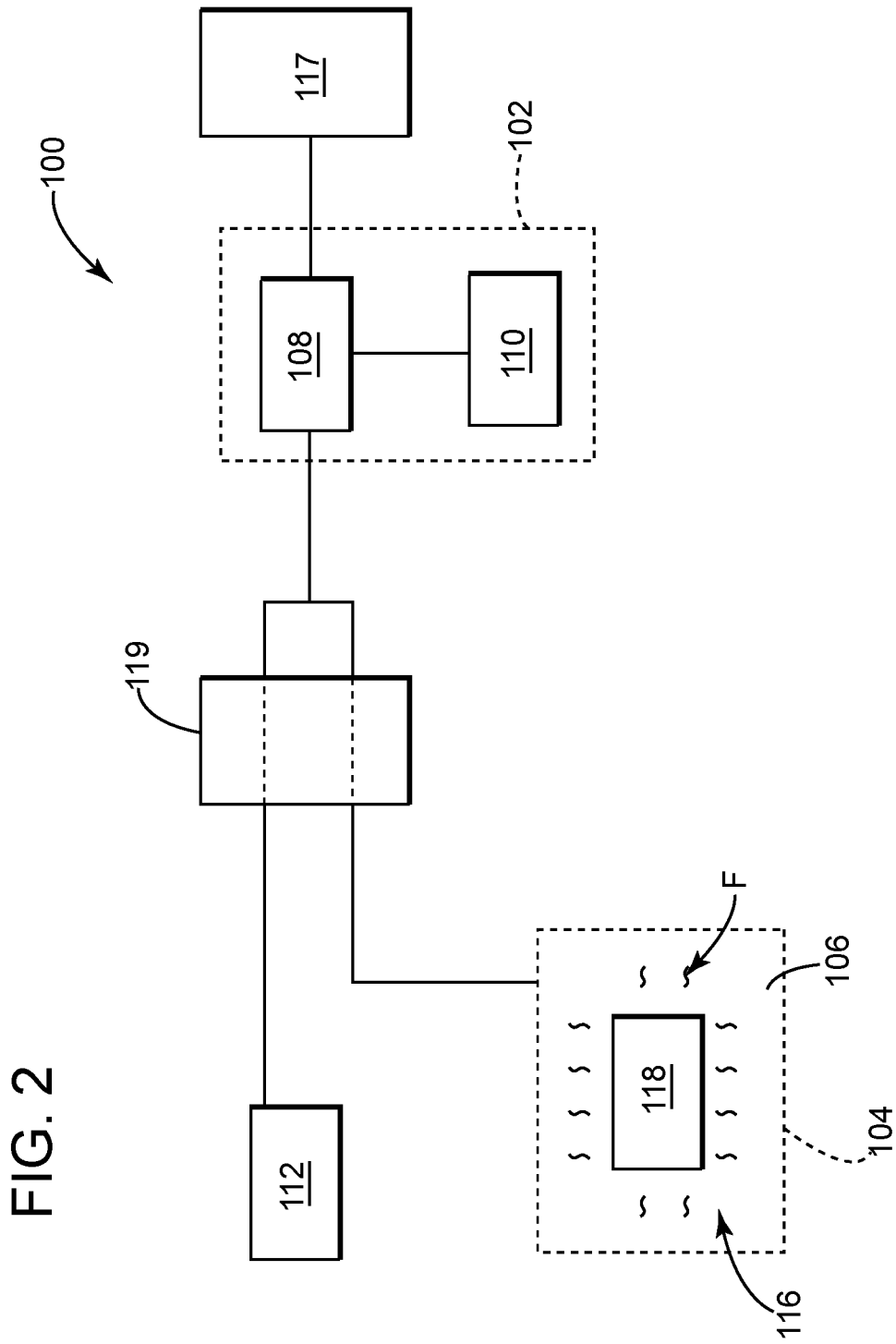
FIG. 2 depicts a schematic diagram of an exemplary embodiment of a system to detect leaks from a seal in a valve.

As best shown in FIG. 2, the system 100 may utilize a configuration that includes a flow generator 117 and flow regulator 119 (e.g., a two-way valve). Examples of the flow generator 117 can include components that generate a vacuum to pull fluid through the system 100. These components can include a pump and like active devices, as well as passive devices (e.g., an injector, ejector, fixed orifice) that can convert flow of a fluid into a low pressure zone to generate the vacuum. The flow regulator 119 can couple the vacuum to one or more of the sample volume 106 and the reference source 112. This configuration introduces a sample from the sample volume 106 and from the reference fluid 114 to the sensor component 108. The system 100 captures a first fluid sample of the fluid in the sample volume 106.

In the configurations of FIGS. 1 and 2, examples of the sensor component 108 can include devices that are sensitive to a property of the first fluid sample and a second fluid sample of the reference fluid 114. These devices can generate a signal with data that provides a value for this property from the first fluid sample and the second fluid sample. In one example, the processing component 110 can compare the value from the first fluid sample and the value of the second fluid sample. Deviation of the value of the first fluid sample relative to the value of the second fluid sample can identify the presence of the working fluid F in the sample volume 106. The processing component 110 can, in turn, generate an output with data that reflects this result.

The reference fluid 114 may be pre-formulated to contain a known concentration of working fluid stored in a container (e.g., the reference source 112). In other examples, the reference fluid 114 may be a preselected neutral fluid (e.g., ambient air) stored in the container, or, as described below, the reference fluid source may be obtained from an ambient atmosphere at a preselected distance from the valve 116. The system 100 may include various configuration of tubing, hoses, conduits and like devices that can transport fluids. Examples of these fluid-carrying devices include flexible or rigid tubes, or a combination thereof, of any suitable material (e.g., metals or plastics).

Figure 3:
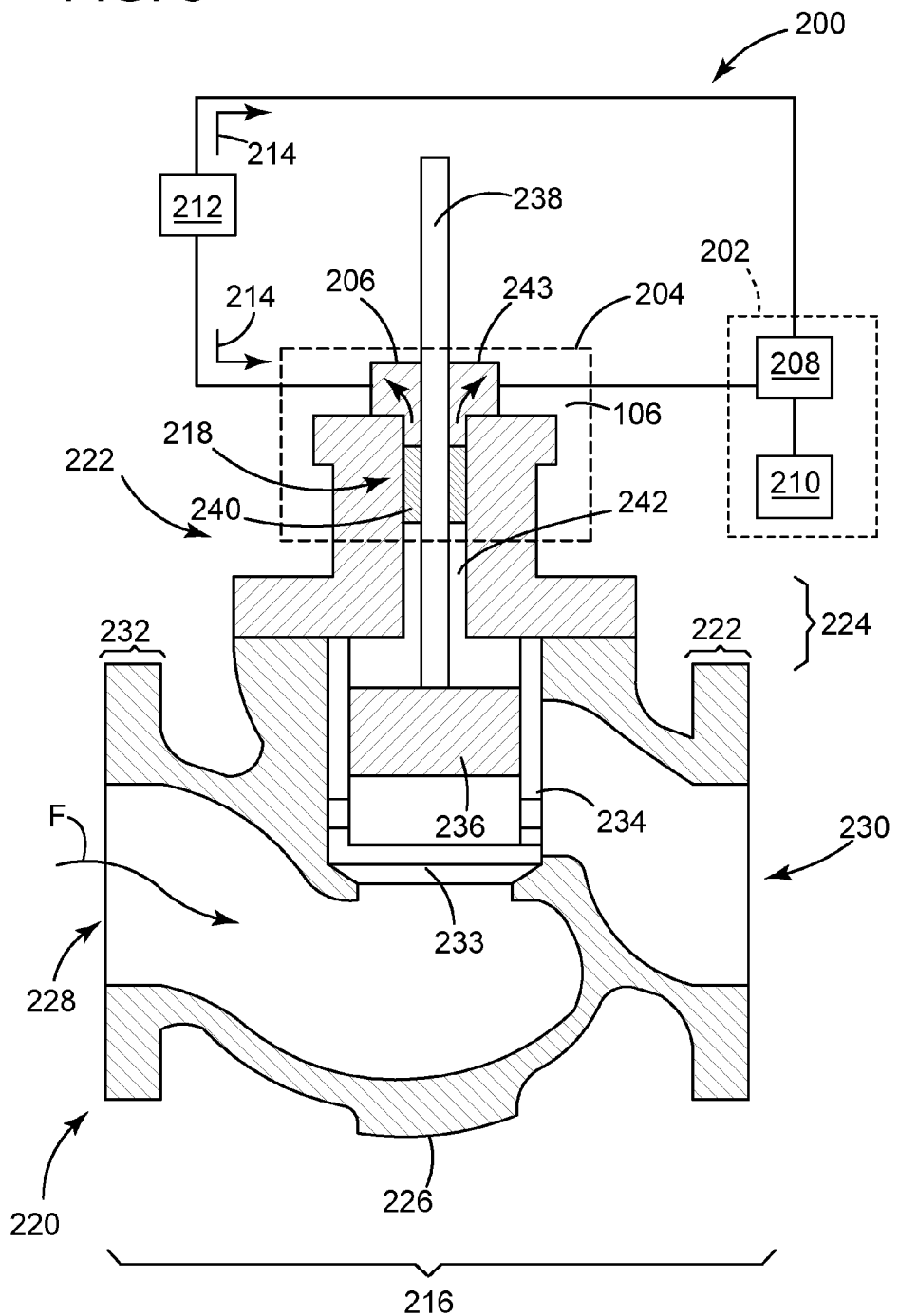
FIG. 3 depicts an exemplary embodiment of a system to detect leaks in a control valve having a first packing configuration shown in elevation, cross-section view.

FIG. 3 illustrates an exemplary embodiment of a system 200 to evaluate performance of a valve (e.g., valve 216, which FIG. 3 shows in an elevation, cross-section view). The valve 216 includes a fluid coupling component 220 and a bonnet component 222 that couple together at an interface 224. The fluid coupling component 220 has a body 226 with a pair of inlet/outlets (e.g., a first inlet/outlet 228 and a second inlet/outlet 230). The inlet/outlets 228, 230 can include a flange portion 232. Configurations of the flange portion 232 are useful to couple the valve 216 to pipes, pipelines, and related devices that carry the working fluid F. The valve 216 also has a trim assembly that includes seat element 233, a cage element 234, a plug element 236, and a valve stem 238. In the packing region 218, the valve 216 has a first packing configuration that includes a first packing element 240 that resides in a bore 242 of the bonnet component 222. The system 200 further includes a shroud 243 that defines the boundaries of the sample volume 206 therein.

Examples of the shroud 243 can form an enclosure that secures, e.g., to the bonnet 222. This enclosure is in position to capture working fluid F that migrates past the first packing element 240. As shown in FIG. 3, the reference fluid 214 flows into the enclosure to mix with fluid that fills the sample volume 206. The sensor component 208 couples with the enclosure. In one example, the sensor component 208 can sample the fluid mixture in the enclosure, which in turn causes the sensor component 208 to generate an output for use by the processing component 210 to identify the presence of the working fluid F in the sample volume.

During operation, valve stem 238 transits inside of the bore 242. This translation moves the plug element 236 to regulate flow of the working fluid F, e.g., between the first inlet/outlet 228 and the second inlet/outlet 230. The first packing element 240 includes devices that can fill gaps between the bore 242 about the valve stem 238. This configuration prevents working fluid F from migrating through the bore 242 and, in one example, into the sample volume 206 in the shroud 243. Examples of these devices can comprise material that reduce friction between the valve stem 238 and the packing element 240. These materials can include a base of polytetrafluoroethylene (PTFE) and/or a graphite.

Figure 4:
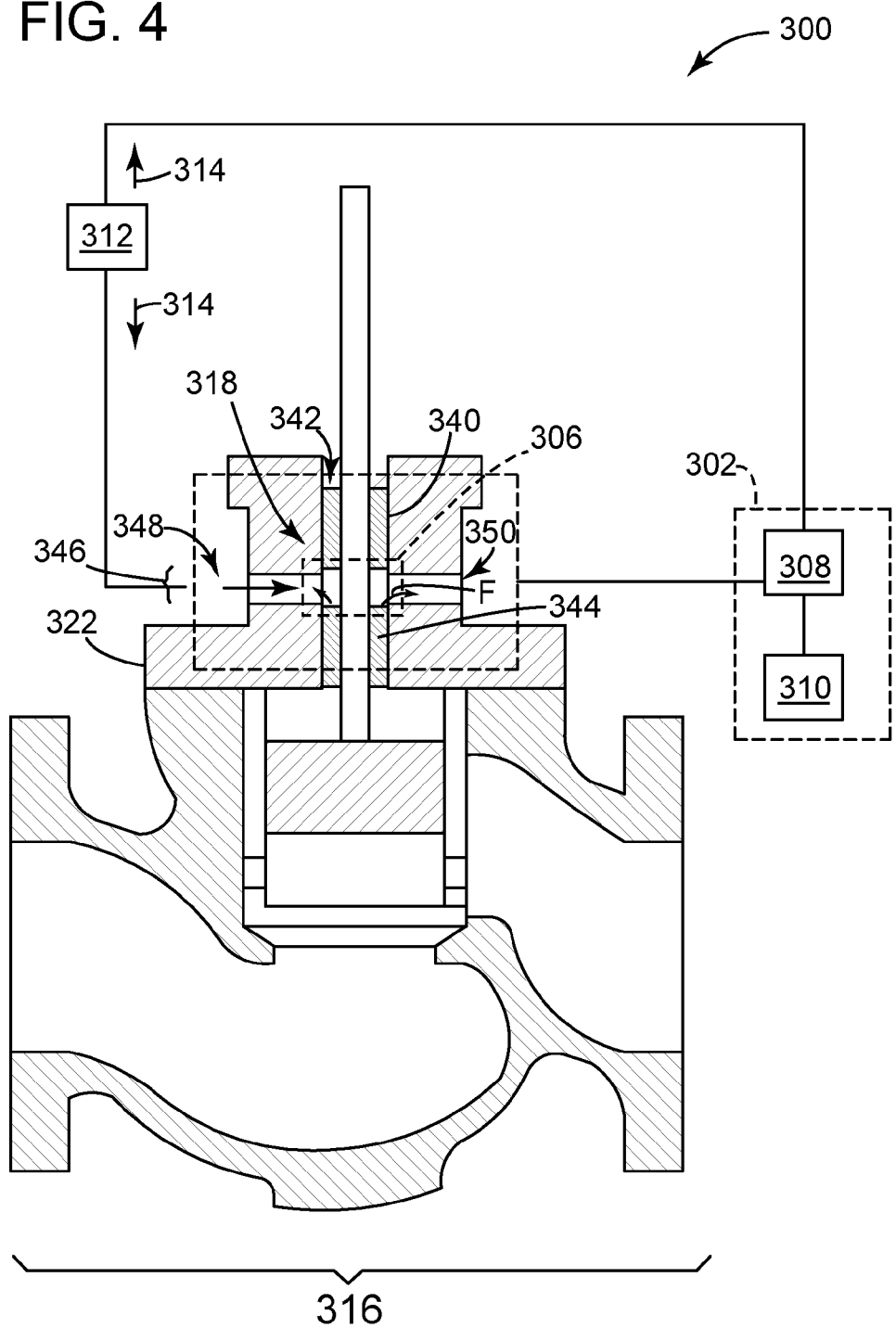
FIG. 4 depicts an exemplary embodiment of a system to detect leaks in a control valve having a second packing configuration shown in elevation, cross-section view.

FIG. 4 depicts an exemplary embodiment of a system 300 to evaluate performance of a valve, e.g., the valve 316. As shown in FIG. 4, the valve 316 has a second packing configuration in the packing region 318 that utilizes the first packing element 340 in combination with a second packing element 344 in the bore 342. Often, the configuration of two packing elements 340, 344 as shown in FIG. 4 is referred to as a double-packing configuration. The sample volume 306 forms between the two packing element 340, 346. The valve 316 also includes a fluid entry element 346 disposed between the first packing element 340 and the second packing element 344. Examples of the fluid entry element 346 include features that allow fluid to enter and/or exit the bore 342. These features may take the form of one or more lateral bores (e.g., a first lateral bore 348 and a second lateral bore 350) that penetrate through the bonnet component 322 to the bore 342.

Examples of the fluid entry element 346 may integrate with the bonnet 322 to form a monolithic unit that can couple with components of the system 300. Other examples may render the fluid entry element 346 as separate pieces that can assemble together into a structure that captures the working fluid F that migrates, e.g., past the second packing element 344. As shown in FIG. 3, the bore 342, alone and/or in combination with one of the lateral bores 348, 350, can form the sample volume 306. The reference fluid 314 can enter through, e.g., the first lateral bore 348, to mix with fluid in the sample volume 306. The sensor component 308 can receive a test sample (e.g., the second fluid sample) from the sample volume 306, which may contain an amount of the working fluid F that migrates through the second packing element 344. Further processing of signals from the sensor component 308 can identify the presence of this amount and, in turn, generate the output with data consistent with the identified leak. In one embodiment of the system 300, the fluid entry element 346 may utilize a single inlet bore that can accommodate one or more hoses and/or tubes to draw off samples from the sample volume 306.

Figure 5:
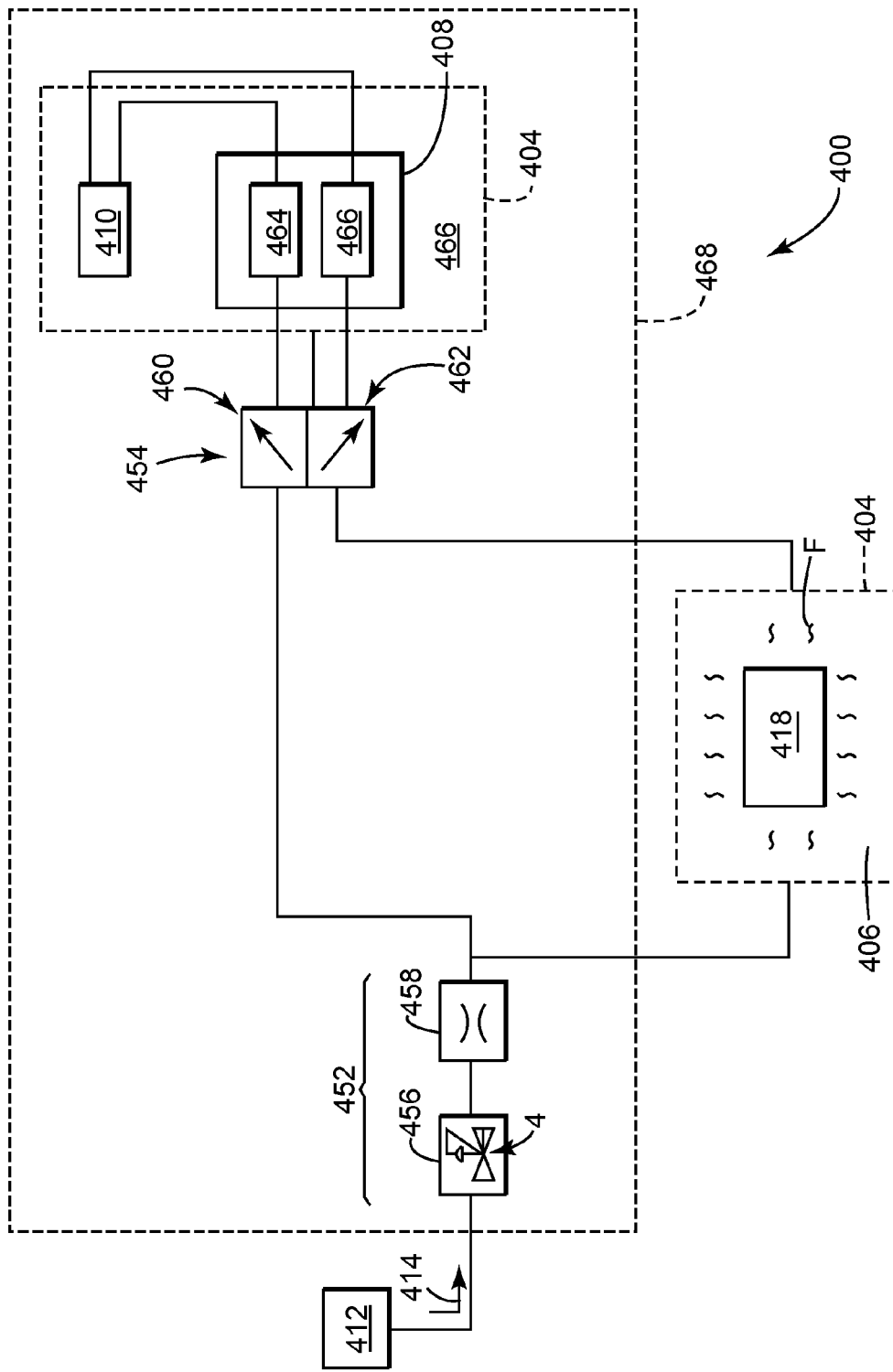
FIG. 5 depicts an exemplary embodiment of a system to detect leaks in a control valve that includes a valve positioner.

FIG. 5 illustrates a schematic diagram of an exemplary leak detection system 400. Examples of the leak detection system 400 may include a flow control component 452 and a valve device 454 that reside, respectively, upstream and downstream of the measurement component 404. This disclosure contemplates that other embodiments may position these components on either the upstream side and the downstream side of the measurement component 104. In FIG. 5, the flow control component 452 includes one or more regulators (e.g., a first regulator 456 and a second regulator 458). The valve device 454 may include a two-way valve (e.g., a solenoid valve) that operates among a plurality of positions (e.g., a first position 460 and a second position 462). The positions 460, 462 couple the sensor component 408 with the reference source 412 and the packing region 418, as desired. The sensor component 408 may include one or more sensor elements (e.g., a first sensor element 464 and a second sensor element 466). In one embodiment, one or more components of the testing system 400 may be incorporated as part of a valve control device 468.

Components for use as the regulators 456, 458 can maintain flow parameters (e.g., flow rate) of the reference fluid 414 that enters the sample volume 406. In one implementation, the selection of components maintains the reference fluid 414 at constant pressure. Examples of these components can include fixed orifices of various internal dimensions and/or qualified flow rates. The fixed orifice can work in combination with a pressure regulator and/or other device to maintain the flow properties of the reference fluid.

Sensors for use as the sensors 464, 466 may generate signals in response to an amount of the working fluid F that is found in a sample from the sample volume 406. These sensors may, likewise, measure other properties (e.g., temperature, pressure, etc.) to calibrate the sensors. This amount may reflect a concentration of the working fluid. In one example, the sensors may generate signals in response to particles, changes in light spectrum, and/or other operative characteristics of the working fluid F. The signals may comprise data in analog and digital formats, which the sensors transmit to the processing component 410 and/or other repository (e.g., memory).

Exemplary sensors can have many different structural features that correspond to the methodology of detection and qualification of the working fluid in the sample. The sensors may include one or more photodetectors that generate the signal in response to light transmission, or light reflection (light scattering), e.g, by a fluid passing through the photodetector. These types of sensors may eliminate the need for a reference sample (e.g., the second fluid sample). For example, the first fluid sample passes directly through the photodetector, which may generate signals with data that indicates the presence of working fluid in the sample. The sensor may also comprise Metal Oxide Semiconductor (MOS) sensors. These types of sensors can generate signals with a value that may indicate the concentration of the working fluid in a sample, e.g., on the order of parts per million (PPM). When using these types of sensors with a flow rate of reference fluid into the sample volume 406 that is known, the system 400 can calculate a rate of leakage based on a concentration of the working fluid that the system 400 detects in the sample.

Embodiments of the system 400 may also utilize one or more tables (e.g., a calibration table or correlation table) that include sample measurements for known constituent components (and fluids) of the working fluid. Measurements from the sensors can be compared to the data in these tables to determine a concentration of the working fluid in the sample volume 406. Examples of possible constituent fluids may include methane, butane, benzene, and propane. In one embodiment, data in the stored calibration table may include data consistent with photocell current magnitudes correlated with physical properties (e.g., particulate concentration) of the working fluid that might be present in the sample.

Figure 6:
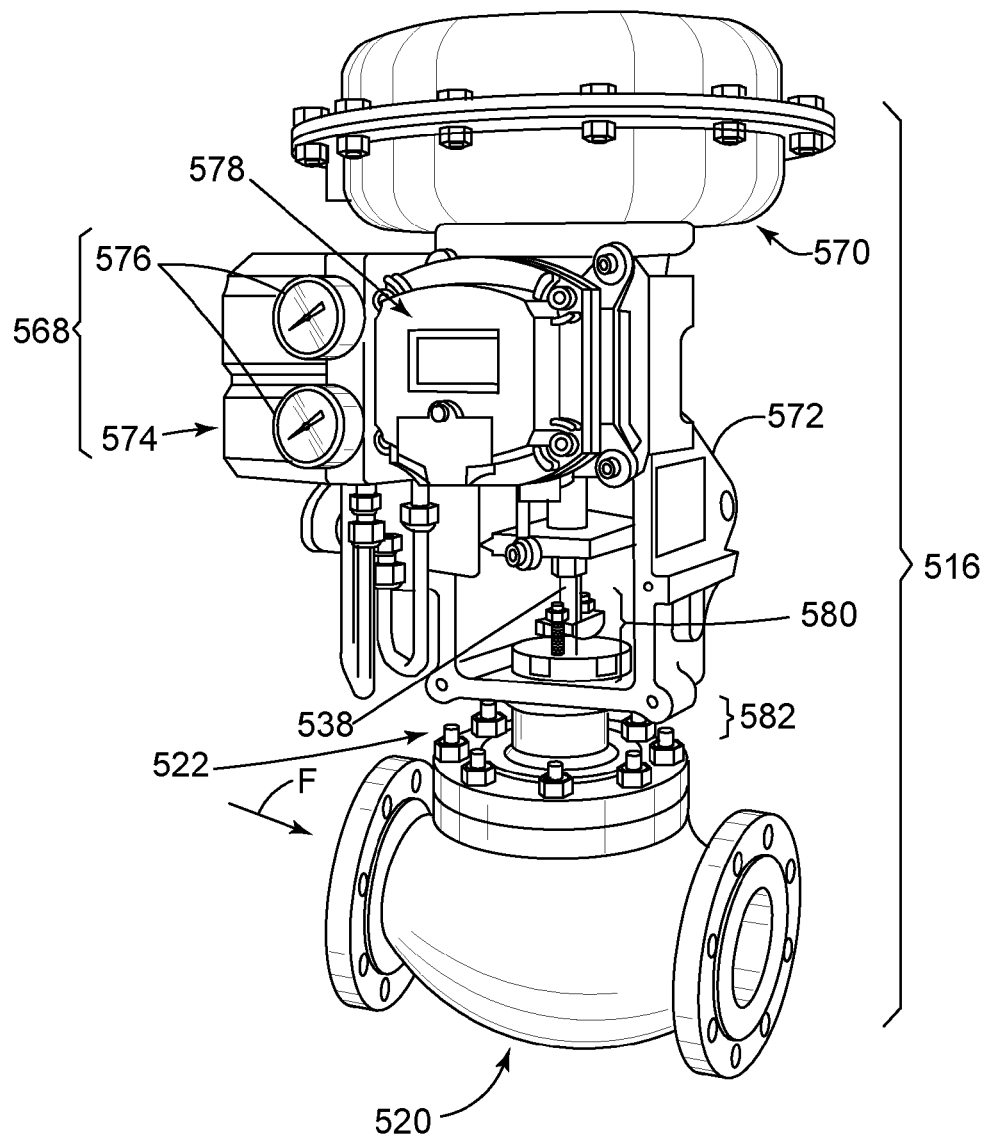
FIG. 6 depicts a perspective view of an example of a control valve.

FIG. 6 depicts a perspective view of an exemplary configuration of a control valve that can benefit from use of a leak detection system (e.g., leak detection systems 100, 200, 300, 400 of FIGS. 1, 2, 3, 4, and 5). In the present example, the valve 516 includes an actuator 570 that couples with the valve stem 538 to actuate a trim assembly (e.g., the trim assembly as shown and discussed in connection with FIG. 3 above). The valve 516 also includes a rigid structure 572 that secures the valve control device 568 and the actuator 570 with the bonnet 522 and/or the fluid coupling 520. In one embodiment, the valve control device 568 comprises a valve positioner 574 with one or more gauges 576 and a display 578. In one implementation, the valve positioner 574 couples with the actuator 570 to cause the actuator 570 to change the position of the valve in response to one or more input control signals the valve positioner 574 receives from a remote device (e.g., a central process control module and/or sensors that monitor changes in the process conditions upstream and/or downstream of the valve 516).

Also noted in FIG. 6, the valve 516 has one or more test regions (e.g., a first test region 580 and a second test region 582). Examples of the first test region 580 may accommodate a shroud (e.g., shroud 242 of FIG. 2) or other feature that can create a sample volume proximate the valve stem 538. The shroud can mount to the structure of the valve 516 to create a sealed (and/or partially sealed) interior environment that can capture working fluid that migrates out of the area of the bonnet 522 proximate the valve stem 538. The second test region 582 may correspond to an area of the valve 516 with packing material in the second packing configuration, e.g., as shown in FIG. 3. This area may integrate a fluid entry element (e.g., fluid entry element 346 of FIG. 3) to allow reference fluid into bore proximate the valve stem 538.

Examples of the valve positioner 574 may include a plurality of valve control components, e.g., a converter, a relay, and processing components. These components interoperate to appropriately actuate the actuator 570 and, in turn, manage the position of the valve stem 538. This operation modulates the flow of working fluid F through the fluid coupling 520. The valve positioner 574 may be configured to perform analysis and/or processing that facilitates identification of working fluid F, e.g., in the test regions 580, 582. For example, the valve positioner 574 may comprise one or more discrete components such as resistors, transistors, capacitors, that reside on one or more substrates, e.g., one or more printed circuit boards. The valve positioner 574 may also include one or more processors, e.g., ASIC, FPGA, or microcontroller that can execute instructions stored in on-board memory in the form of computer programs, software, and firmware. In one embodiment, the processing components can include one or more programmable switches and inputs that couple with sensors for position feedback, a proportional-integral-derivative (PID) controller, a display (e.g., an LCD display), and similar components that facilitate use and operative control over the control valve 100.

FIG. 7 illustrates a flow diagram of an exemplary method 600 to detect leaks in the structure of a valve. The method 600 includes, at step 602, receiving signals from one or more sensors, the signals comprising data that defines a property of a first fluid sample with fluid from a sample volume in proximity to the valve and a second fluid sample with fluid from a reference source. The method 600 also includes, at step 604, comparing the data of the first fluid sample with the data of the second fluid sample and, at step 606, generating an output in response to a deviation between the property of the first fluid sample and the property of the second fluid sample.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system to detect leaks at a seal, said system comprising:
   a measurement region forming a sample volume that can receive working fluid from the seal;
   a sensor component spaced apart from the measurement region and coupled with the measurement region to receive a first fluid sample from the sample volume, the sensor component configured to receive a second fluid sample that is different from the first fluid sample so as to generate signals comprising data that reflects a property of each of the first fluid sample from the sample volume and the second fluid sample;
   a flow regulator configured to be interposed between the sensor component and each of the sample volume and a reference source for the second fluid sample, wherein the flow regulator has a first position and a second position, one each configured to regulate the first fluid sample and the second fluid sample through the flow regulator and to the sensor component, respectively; and
   a processing component coupled with the sensor component, the processing component comprising a processor, a memory coupled with the processor, and executable instructions stored in the memory and configured to be executed by the processor, the executable instructions comprising instructions for the processor to:
   receive the signals; and
   generate an output in response to a deviation between the property of the first fluid sample and the property of the second fluid sample.

2. The system of claim 1, wherein the executable instructions comprise instructions for the processor to compare the data that reflects the property of the first fluid sample and the second fluid sample.

3. The system of claim 1, wherein the sample volume resides inside of the seal.

4. The system of claim 1, further comprising a shroud that couples with the seal to form the sample volume.

5. The system of claim 1, further comprising a flow generator coupled with the sample volume, wherein the flow generator is configured to generate a vacuum to draw the first fluid sample to the sensor component.

6. The system of claim 1, further comprising a flow control component that couples upstream of the sample volume, wherein the flow control component is configured to maintain one or more flow parameters of fluid upstream of the sample volume.

7. The system of claim 6, wherein the sensor component couples downstream of the sample volume.

8. The system of claim 1, wherein the sensor component comprises one or more sensors, and wherein the one or more sensors are selected from a group consisting of a chemical sensing element, an absorption spectrum sensing element, a metal oxide semiconductor based sensing element, a photodetector based sensing element, and combinations thereof.

9. A valve positioner for a valve, said valve positioner comprising:
   a sensor component configured to receive a first fluid sample and a second fluid sample that is different from the first fluid sample;
   a processor coupled with the sensor component;
   an electronic memory coupled with the processor;
   a flow regulator configured to be interposed between the sensor component and each of the sample volume and a reference source for the second fluid sample, wherein the flow regulator has a first position and a second position, one each configured to regulate the first fluid sample and the second fluid sample through the flow regulator and to the sensor component, respectively; and
   executable instructions stored in the memory and configured to be executed by the processor, the executable instructions comprising instructions for:
   receiving signals with data that defines a property of the first fluid sample and the second fluid sample, the first fluid sample comprising fluid from a sample volume in proximity to the valve; and
   generating an output in response to a deviation between the property of the first fluid sample and the property of the second fluid sample.

10. The valve positioner of claim 9, further comprising a flow component coupled upstream of the sample volume, wherein the flow control component is configured to maintain one or more flow parameters of fluid upstream of the sample volume.

11. The valve positioner of claim 9, wherein the output comprises data that describes the presence of the working fluid in the sample volume.

12. The valve positioner of claim 11, wherein the property describes an amount of the working fluid in the first fluid sample and the second fluid sample.

13. A valve, comprising:
a packing region comprising a first packing element;
a measurement region in proximity to the packing region, the measurement region forming a sample volume to receive a working fluid that migrates from the packing region into the sample volume;
a sensor component spaced apart from and coupled with the measurement region to receive a first fluid sample from the sample volume, the sensor component configured to receive a second fluid sample that is different from the first fluid sample so as to generate a signal including data defining a property of each of the first fluid sample from the sample volume and the second fluid sample; and
a flow regulator configured to be interposed between the sensor component and each of the sample volume and a reference source for the second fluid sample, wherein the flow regulator has a first position and a second position, one each configured to regulate the first fluid sample and the second fluid sample through the flow regulator and to the sensor component, respectively.

14. The valve of claim 13, further comprising a bonnet and a fluid coupling that couples with the bonnet, wherein the sample volume resides outside of the bonnet.

15. The valve of claim 14, further comprising a shroud coupled on the exterior of the bonnet, wherein the shroud forms the sample volume.

16. The valve of claim 13, further comprising a second packing element disposed in the packing region and spaced apart from the first packing element, wherein the sample volume is disposed between the first packing element and the second packing element.

* * * * *